United States Patent [19]
Haeber et al.

[11] Patent Number: 4,550,936
[45] Date of Patent: Nov. 5, 1985

[54] MARINE RISER COUPLING ASSEMBLY

[75] Inventors: John A. Haeber, Fillmore; John K. Rains, Ventura; Brad D. Beitler, Ojai; George S. Kukuchek, Ventura, all of Calif.

[73] Assignee: Vetco Offshore, Inc., Ventura, Calif.

[21] Appl. No.: 488,836

[22] Filed: Apr. 26, 1983

[51] Int. Cl.[4] .............................................. F16L 35/00
[52] U.S. Cl. ...................................... 285/26; 285/81; 285/137 A; 285/370; 285/315; 285/321; 285/347; 285/351
[58] Field of Search ................. 285/137 A, 25, 26, 28, 285/29, 81, 82, 86, 370, 347, 308, 307, 315, 321, 24, 27, 351

[56] References Cited
U.S. PATENT DOCUMENTS

| 3,189,098 | 6/1965 | Haeber | 285/137 A X |
| 3,458,219 | 7/1969 | Wesch | 285/370 X |
| 3,899,199 | 8/1975 | Garey | 285/27 |
| 4,374,595 | 2/1983 | Watkins | 285/137 A |
| 4,408,783 | 10/1983 | Gruller | 285/315 X |

FOREIGN PATENT DOCUMENTS 1417080  9/1965  France .................. 285/370

Primary Examiner—Dave W. Arola
Attorney, Agent, or Firm—Edward L. Kochey, Jr.

[57] ABSTRACT

A marine riser coupling assembly comprised of a pair of flanged couplings (14, 16). A pin insert (36) is retained (44, 54) within tubular portions (22, 24) of the couplings. The insert has multiple outside diameters (50, 50), and seals (66, 74) on each.

19 Claims, 4 Drawing Figures

MARINE RISER COUPLING ASSEMBLY

BACKGROUND OF THE INVENTION

This invention relates to marine risers for deep subsea drilling and production and in particular to a coupling assembly therefor.

Marine risers are run from floating vessels or platforms to subsea wellheads for drilling and production operations. The riser sections are tubular, in the order of 20 inch diameter and 50 feet long. They are assembled at the surface and are run from the vessel to the wellhead. In assembling these, a successive section is first stabbed into a preceding section and the connector then bolted up. Accordingly, easy stabbing is desired.

The riser is usually highly tensioned at the upper end to avoid buckling and is also subject to cyclical bending caused by current and/or vessel drift. The riser must remain leak tight over its life to prevent ingress of sea water and/or leakage of mud during drilling, and potential oil during production. This despite the cyclical loading placed thereon.

Handling of large risers sections can cause damage to the couplings. A design tolerant of such damage and/or one easily repaired is therefore desirable.

SUMMARY OF THE INVENTION

The coupling assembly is comprised of a pair of couplings, at the end of an adjacent marine riser pipe sections with a tubular pin insert fitting within the couplings. Each coupling is flanged with the flange being integral with a tubular portion of the connector which is in turn welded to the riser pipe section.

The tubular portions of each coupling have a portion of the inside diameter greater than that of the riser pipe sections to which they are connected and the pin fits within this larger diameter portion, preferably having an inside diameter approximately equal to that of the adjacent riser pipe sections. The flanges have a plurality of alignable bolt holes and a plurality of bolts secure the flanges together in mutually contacting relationship.

The pin is radially sealed to the coupling with the groove in the pin containing an O-ring. A contractable retaining ring operates in a groove within the pin and a groove within the coupling to secure the pin within one of the couplings.

Stabbing is facilitated since the pin insert has a small diameter portion near its outboard end and a larger diameter portion towards its center. Furthermore, the stabbing overlap between the pin insert and coupling is greater than the stabbing overlap between attached choke and kill lines so that the initial stab is made over the insert and the riser may thereafter be rotated to easily stab the choke and kill lines.

Both couplings are preferably identical so that the pin inserts may be located in either coupling, thereby providing the ability to run the riser either pin up or pin down as desired. Furthermore, should the pin be damaged it may be removed and replaced. Any repair work need be done only on the relatively easy handled pin insert rather than handling the entire riser section.

Even a rigidly bolted flanged connector has some movement during bending as experienced by the riser. Even if the pin insert were forced in with an interference fit it would be loose compared to a pin which is machined at the end if a riser section. Accordingly, bending strain of the connector is absorbed at two ends of the pin thereby taking half of the differential movement at each end. This minimizes the differential movement which must be taken by the seals thereby improving the long term sealing of the connector.

Even with the most precise machining of large couplings is known that some out of roundness develops after the machining has been completed. With a pin integrally formed with one of the flanges, out of roundness of the adjoining sections cannot be readily absorbed by deflection of the pin. With the relatively loose pin insert, which is not reinforced by a flange, it may deflect to absorb the out of roundness of the adjoining sections, thereby improving the sealing capabilities.

DESCRIPTION OF THE PREFERRED EMBODIMENT

Figure 1:
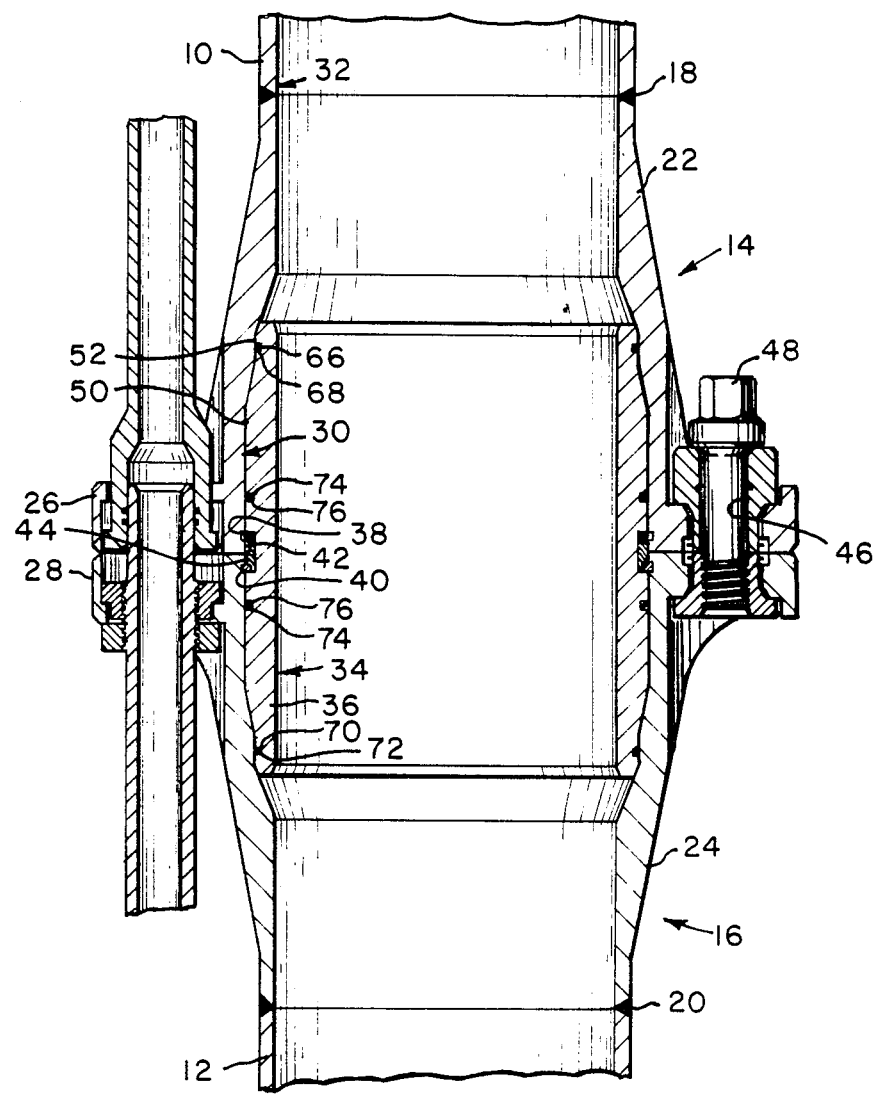
FIG. 1 is a sectional elevation of a completed connector assembly.

Marine riser pipe sections 10 and 12 have couplings 14 and 16 welded thereto at locations 18 and 20. Each connector includes a tubular portion 22 and 24 and a flange portion 26 and 28 integral therewith.

Each tubular portion has a portion of the inside diameter 30 greater than the inside diameter 32 of the riser section. The inside diameter 34 of pin insert 36 is substantially the same as the inside diameter of the riser pipe section.

The pin insert is tubular and has the outside of each end substantially conforming to the inside shape of the corresponding tubular portion. The pin is also located entirely within the tubular portion.

Each tubular portion has a box retaining groove 38 and 40 around the inner periphery. A pin retaining groove 42 is located on the outer periphery of the pin insert 36. A split retaining ring 44 is located partially within the box retaining groove and remains partially within the pin retaining groove so that the pin insert 36 is retained within connector 16.

The flange portion of each coupling has a plurality of alignable bolt holes 46 with a plurality of bolts 48 securing the flanges together in mutually contacting relationship.

Figure 4:
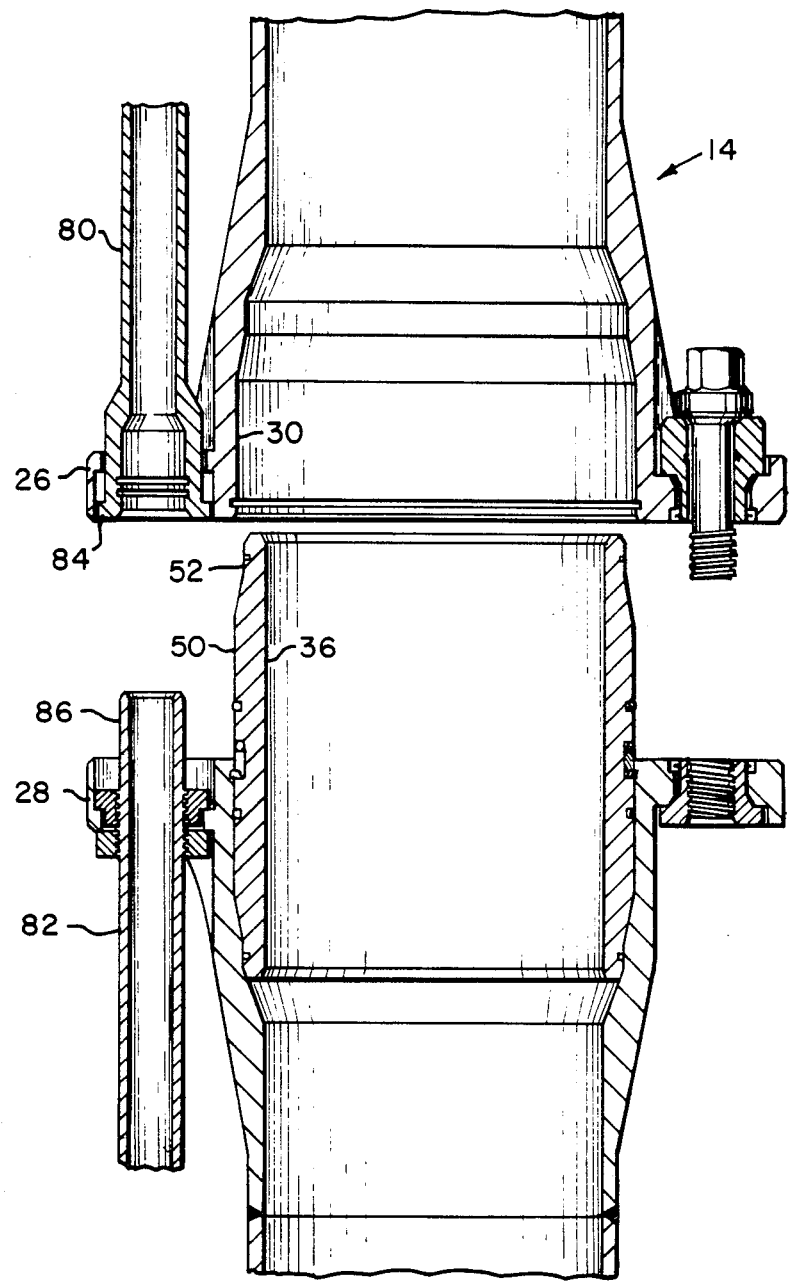
FIG. 4 is a sectional elevation of the coupling just prior to stabbing.

The pin insert 36 has a first larger outside diameter 50 toward its central portion and a second lesser diameter 52 toward its outboard end. As best seen in FIG. 4 this facilitates initial stabbing of the connector.

Each of the connectors is identical. While box retaining groove 38 is not used as illustrated, the retaining ring could be located in the upper portion of the pin insert groove so that the pin insert is retained in the upper connector 14 rather than the lower connector 16.

Figure 2:
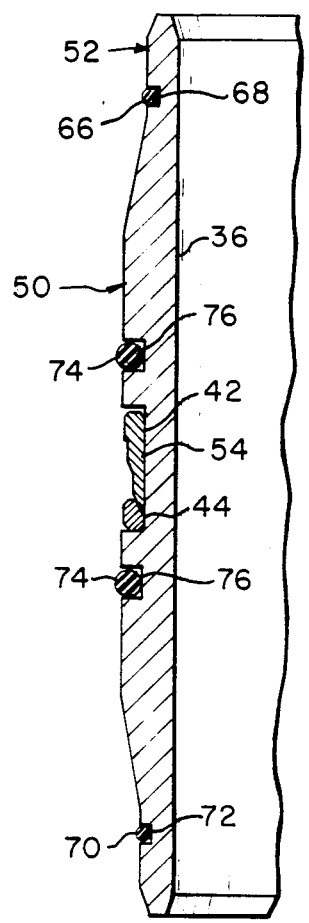
FIG. 2 is a sectional elevation of the pin insert.
Figure 3:
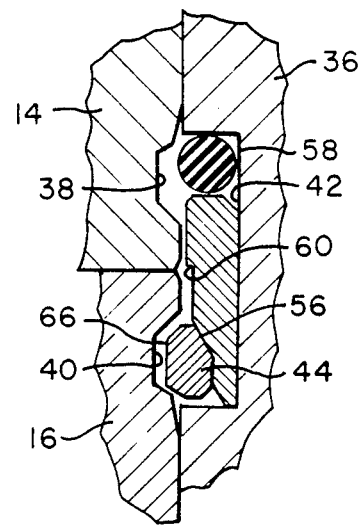
FIG. 3 shows a detail of the pin insert and the cooperating retaining means.

Retaining ring 44 is preferably inwardly biased so that it is normally in the position illustrated in FIG. 2. In any event the ring must be compressed to this position for installation of the pin insert 36 within coupling 16. Locking ring 54 is held at this time in the upward position shown in FIG. 2.

When the pin insert has been placed within the coupling, if the retaining ring 44 snaps outwardly into groove 40, the locking ring 54 is simply moved down to backup the retaining ring. If the retaining ring does not snap outwardly, face 56 of the locking ring will force the retaining ring outwardly as retaining ring 54 is moved down. After the locking ring 54 has been moved downwardly a blocking ring 58, which may be in the form of a O-ring, is inserted above the locking ring thereby guarding against undesired upward movement of the locking ring.

A notch 60 on the locking ring permits it to be grasped for upward movement during disassembly of the connection. Furthermore, should the retaining ring not disengage, a 45° face 62 urges the ring inwardly on upward movement of the pin insert.

A radially sealing means in the form of an O-ring 66 in groove 68 is provided on the smaller diameter portion of the pin insert at one end. A similar O-ring 70 in groove 72 is located on the opposite end of the pin insert. On the larger diameter portion of the pin insert, O-rings 74 are located in grooves 76 providing a second sealing means on each end of the pin. These not only provide double sealing on each end of the pin but they contribute to the centering of the pin inserts within the tubular portion thereby improving the sealing ability of each of the O-rings.

The pin is free to remove with respect to the couplings by slight amounts since it is not welded to either. Accordingly, strain occurring in the couplings under bending can be absorbed at both ends of the pin insert as contrasted the connectors where the pin is integrally formed with one of the couplings. Therefore, differential movement between the sealing surfaces is cut in half, thereby improving the ability of the connector to seal throughout the cyclical bending which occurs.

Choke and kill lines 80 and 82 are loosely secured to corresponding flanges 26 and 28, line 80 has a female stab connection 84 or line 82 has a male stab connection 86.

The stab overlap is the depth of penetration of the stabbed connection. It follows that the stab member with the maximum stab overlap will be the first to engage during the stabbing operation. As best seen in FIG. 4 the initial stabbing engagement occurs between outside diameter 52 of the pin insert 36 and the outside diameter 30 of connector 14, this being the portion of the connector with the maximum stab overlap. This difference in diameters simplifies the initial stabbing of the connection.

After guidance from the initial stab the larger outside diameter 50 of the pin insert 36 engages the inner surface 30 bringing the connection into accurate alignment. This stab overlap is greater than that of the choke and kill lines.

After achieving the proper rotation for the choke and kill lines to engage the stab is fully made engaging connector 86 and 84 of the choke and kill lines.

The flange is thereafter securely tightened with a plurality of bolts 48.

We claim:

1. A coupling assembly, for a marine riser subject to high tension and bending loads comprising:
    a first coupling having a tubular portion welded to a riser pipe section, and a flange portion integral with the tubular portion;
    a second coupling having a tubular portion welded to a riser pipe section, and a flange portion integral with the tubular portion;
    the tubular portions of each coupling having a portion of the inside diameter greater than that of the riser section;
    the tubular portion of at least one of said couplings having a box retaining groove around the inner periphery of the tubular portion;
    fastening means for fastening said flange portions together in mutually contacting relationship;
    a tubular pin insert, having the outside of each end substantially conforming to the inside shape of a corresponding tubular portion, and locatable entirely within the tubular portions;
    at least one sealing means for radially sealing between said pin insert and a corresponding tubular portion on each end of said insert;
    a pin retaining groove located on the outside periphery of said pin insert; and
    a retaining ring located in said pin retaining groove and movable outwardly partially into said box retaining groove when said pin insert is located within a coupling, whereby said pin insert is loosely retained within one of said couplings.

2. A coupling assembly as in claim 1; said fastening means comprising;
    the flange portion of each coupling having a plurality of alignable bolt holes; and
    a plurality of bolts for bolting said flange portions together in mutually contacting relationship.

3. A coupling assembly as in claim 1; said pin insert having at each end a first larger outside diameter toward its central portion and a second lesser diameter toward its outboard end, whereby stabbing of the riser section is facilitated.

4. A coupling assembly as in claim 1; said pin having an inside diameter substantially the same as that of the riser pipe section to which the couplings are welded.

5. A coupling assembly as in claim 1; each of said couplings having a box retaining groove, said couplings being identical.

6. A coupling assembly as in claim 1; said retaining ring comprising an inwardly biased split ring; an inwardly biased locking ring slidable in said pin retaining groove and adapted to slide behind said retaining ring when said retaining ring is latched into the box retaining groove; and blocking means for retaining said locking ring behind said retaining ring.

7. A coupling assembly as in claim 1; said seal means comprising a groove in said pin and an O-ring located in said groove.

8. A coupling assembly as in claim 3; having also sealing means on both the larger and lesser diameter portions of each end of said pin.

9. A coupling assembly as in claim 3; a choke and kill line secured to each riser section, including a female stab connector secured to one of said flange portions, and a male stable connector secured to the other of said flange portion; the stab overlap of said choke and kill connectors being less than the stab overlap of the larger dimension portion of said pin insert and coupling, whereby initial stabbing occurs between said pin insert and coupling.

10. A coupling assembly as in claim 3; said pin having an inside diameter substantially the same as that of the riser pipe section to which the couplings are welded; and
    each of said couplings have as box retaining groove, said coupling being identical.

11. A coupling assembly as in claim 10; a choke and kill line secured to each riser section, including a female stab connector secured to one of said flange portions, and a male stable connector secured to the other of said flange portion; the stab overlap of said choke and kill connectors being less than the stab overlap of the larger dimension portion of said pin insert and coupling, whereby initial stabbing occurs between said pin insert and coupling.

12. A coupling assembly as in claim 5; a choke and kill line secured to each riser section, including a female stab connector secured to one of said flange portions, and a male stab connector secured to the other of said flange portion; the stab overlap of said choke and kill connectors being less than the stab overlap of the larger dimension portion of said pin insert and coupling, whereby initial stabbing occurs between said pin insert and coupling.

13. A connector assembly as in claim 12; the stab overlap of the larger dimension portion of said pin insert and coupling being greater than the stab overlap of said choke and kill connector.

14. A coupling assembly as in claim 5; a choke and kill line secured to each riser section, including a female stab connector secured to one of said flange portions, and a male stab connector secured to the other of said flange portion; the stab overlap of said choke and kill connectors being less than the stab overlap of the larger dimension portion of said pin insert and coupling, whereby initial stabbing occurs between said pin insert and coupling.

15. A coupling assembly as in claim 5; said seal means comprising a groove in said pin and O-ring located in said groove; and
    sealing means on both the larger and lesser diameter portions of each end of said pin.

16. A coupling assembly as in claim 14; a choke and kill line secured to each riser section, including a female stab connector secured to one of said flange portions, and a male stab connector secured to the other of said flange portion; the stab overlap of said choke and kill connectors being less than the stab overlap of the larger dimension portion of said pin insert and coupling, whereby initial stabbing occurs between said pin insert and coupling.

17. A coupling assembly, for a marine riser subject to high tension and bending loads comprising:

a first coupling having a tubular portion welded to a riser pipe section, and a flange portion integral with the tubular portion;

a second coupling having a tubular portion welded to a riser pipe section, and a flange portion integral with the tubular portion;

the tubular portions of each coupling having a portion of the inside diameter greater than that of the riser pipe section;

the tubular portion of each of said couplings having a box retaining groove around the iner periphery of the tubular portion;

the flange portion of each coupling having a plurality of alignable bolt holes;

a plurality of bolts for bolting said flange portions together in mutually contacting relationship;

a tubular pin insert, having the outside of each end substantially conforming to the inside shape of a corresponding tubular portion, the inside diameter substantially the same as the riser pipe section, and locatable entirely within the tubular portions;

at least one sealing means for radially sealing between said pin insert and a corresponding tubular portion on each end of said insert;

a pin retaining groove located on the outside periphry of said pin insert; and a retaining ring located in said pin retaining groove and movable outwardly partially into said box retaining groove when said pin insert is located within a coupling, whereby said pin insert is loosely retained within one of said couplings.

18. A coupling assembly in as in claim 17; said retaining ring comprising an inwardly biased split ring; an inwardly biased locking ring slidable in said pin retaining groove and adapted to slide behind said retaining ring when said retaining ring is latched into the box retaining groove; and blocking means for retaining said locking ring behind said retaining ring; and
    said sealing means located on both the larger and lesser diameter portions of each end of said pin, and comprising a groove in said pin and an O-ring located in said groove.

19. A coupling assembly as in claim 18; a choke and kill line secured to each riser section, including a female stab connector secured to one of said flange portions, and a male stab connector secured to the other of said flange portion; the stab overlap of said choke and kill connectors being less than the stab overlap of the larger dimension portion of said pin insert and coupling, whereby initial stabbing occurs between said pin insert and coupling.

* * * * *

UNITED STATES PATENT AND TRADEMARK OFFICE
CERTIFICATE OF CORRECTION

PATENT NO. : 4,550,936
DATED : November 5, 1985
INVENTOR(S) : John A. Haeber et al.

It is certified that error appears in the above—identified patent and that said Letters Patent is hereby corrected as shown below:

Column 5, line 41, change "14" to --15--.

Signed and Sealed this

Nineteenth Day of August 1986

[SEAL]

Attest:

Attesting Officer

DONALD J. QUIGG

Commissioner of Patents and Trademarks